Jan. 26, 1937.                E. G. WILSON                 2,068,725
                             SORTING MACHINE
                         Filed Oct. 2, 1933            4 Sheets-Sheet 1

INVENTOR
Evan G. Wilson
By his Attorney
Harlow M. Davis

Jan. 26, 1937.   E. G. WILSON   2,068,725
SORTING MACHINE
Filed Oct. 2, 1933   4 Sheets-Sheet 2
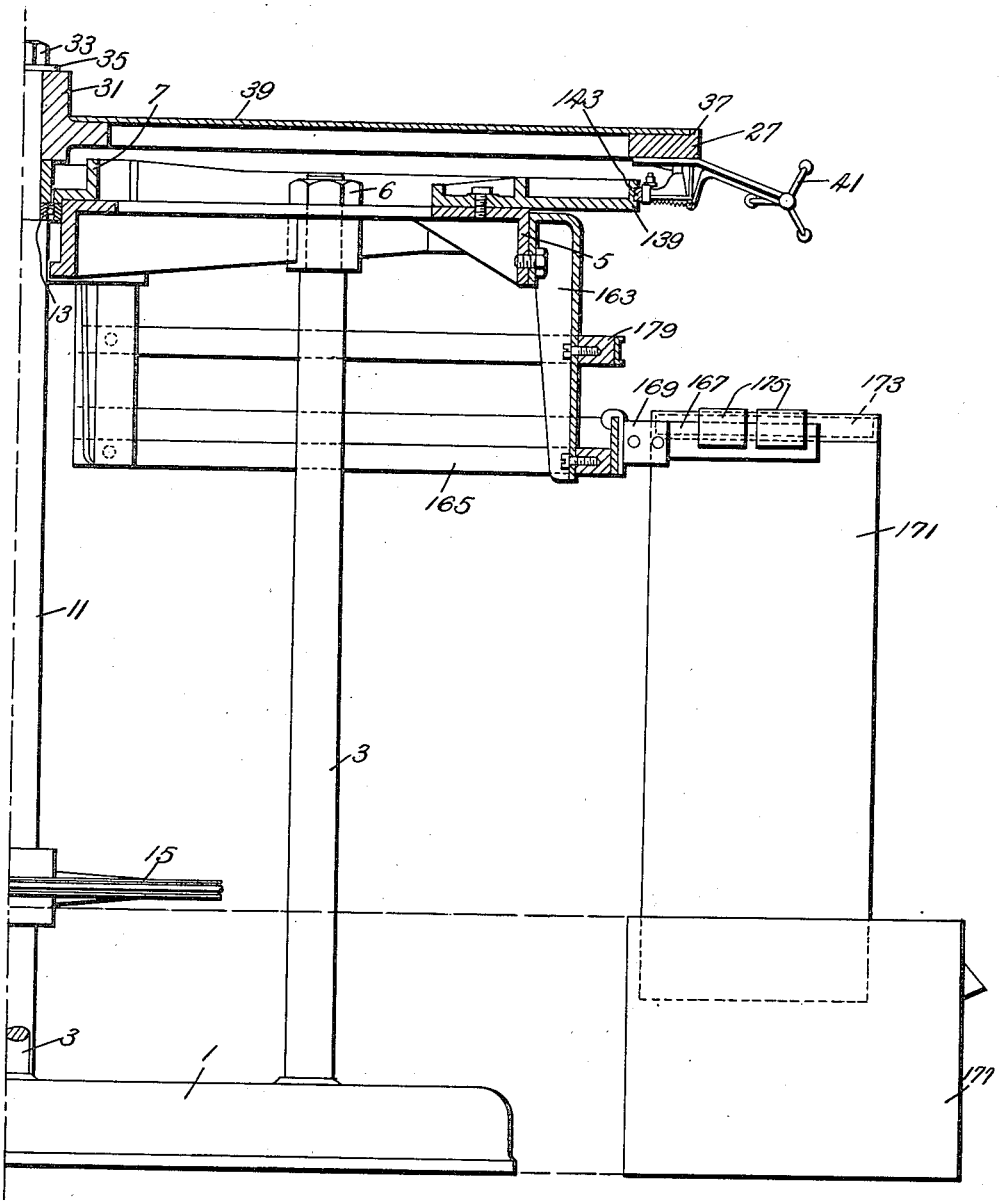
Fig.1ᵃ
INVENTOR
Evan G. Wilson
By his Attorney
Harlow M. Rains

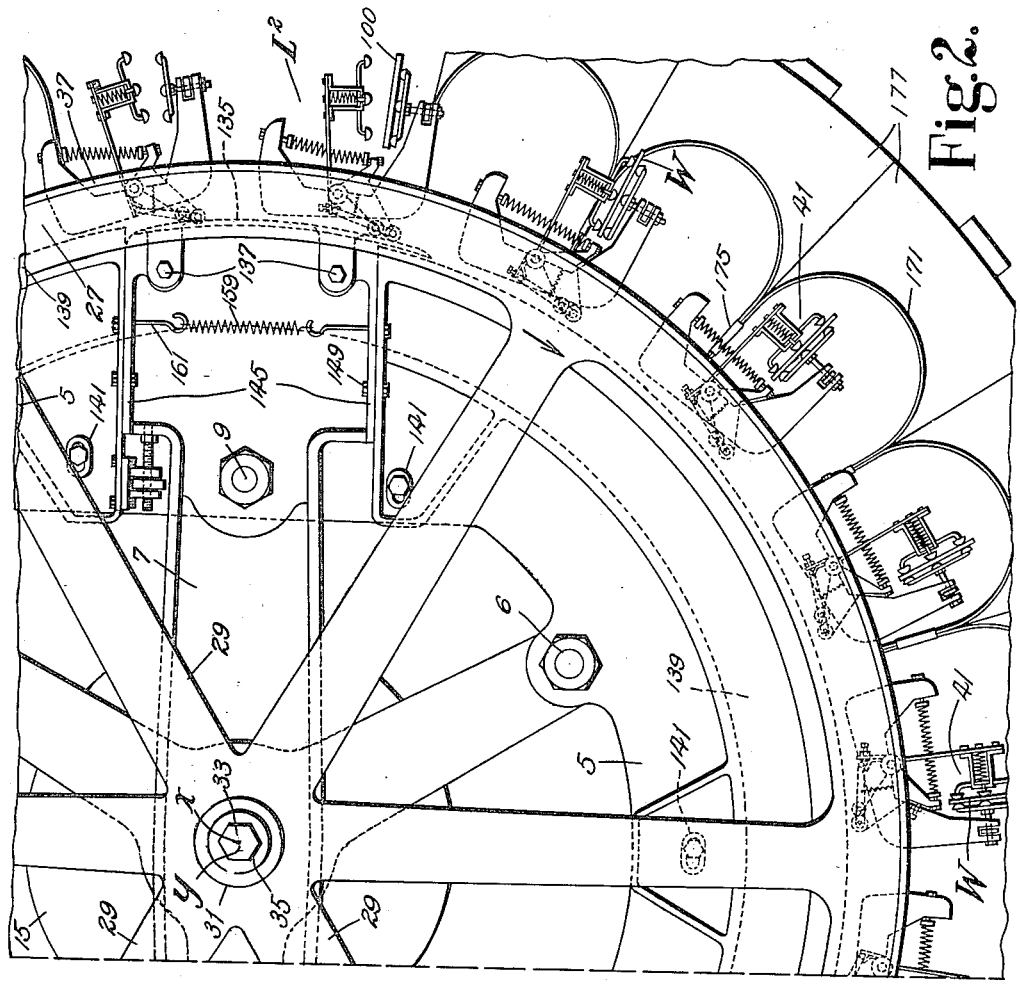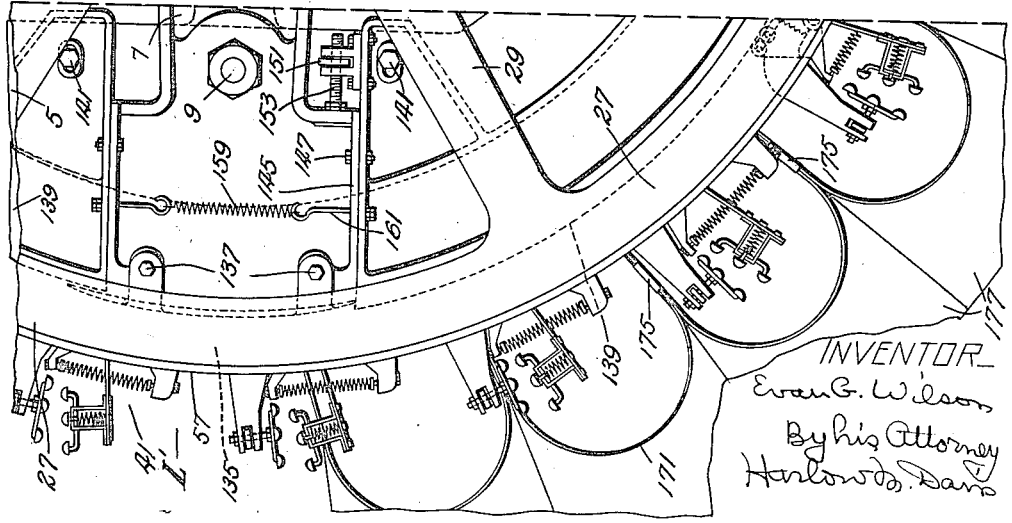

Jan. 26, 1937.　　　　E. G. WILSON　　　　2,068,725
SORTING MACHINE
Filed Oct. 2, 1933　　　　4 Sheets-Sheet 4

INVENTOR
Evan G. Wilson
By his Attorney
Harlow D. Davis

Patented Jan. 26, 1937

2,068,725

UNITED STATES PATENT OFFICE 2,068,725

SORTING MACHINE

Evan George Wilson, Blundellsands, near Liverpool, England, assignor to United Shoe Machinery Corporation, Paterson, N. J., a corporation of New Jersey Application October 2, 1933, Serial No. 691,810
In Great Britain October 5, 1932

7 Claims. (Cl. 209—89)

This invention relates to sorting machines and is herein disclosed as embodied in a machine for distributing shoe parts such as heel lifts and soles in groups in accordance with their thicknesses.

In the manufacture of boots and shoes it is desirable to gather into groups all those heel lifts or soles which are within a given small range of thicknesses so as to facilitate the incorporation of these articles in the boots or shoes of which they are to form a part. Machines for accomplishing this result have comprised a rotary carrier for a series of work holding clamps having jaws which are opened as the clamps approach a loading station where pieces of work are presented one by one between them and are then closed upon the work and proceed on their travel. The jaws of any particular clamp which are engaging the work are of course spaced apart a distance equal to the thickness of the piece of work engaged by them; and this fact is taken advantage of to provide with respect to each clamp a release member the distance of which from the axis of rotation of the carrier depends upon the thickness of the piece of work held by that clamp.

In machines of this general type in which the jaws of traveling work-clamping means are opened to permit the work to fall by gravity into one or another of a series of receptacles arranged below the path of travel of the work-clamping means, the opening of the jaws has taken place comparatively slowly with the result that the piece of work has not been instantly released and has thus been liable to be carried along too far before it fell from the clamping means. In accordance with one feature of the present invention means are provided for causing the jaws to fly widely apart when they are opened and thus to release the work instantly. In the illustrated construction, this is accomplished by the expansion of a spring which is held compressed until the release member of the clamping means is moved whereupon the spring is freed and causes the jaws of the clamp to fly apart.

This and other features of the invention including certain details of construction and combinations of parts will be described as embodied in an illustrated machine and pointed out in the appended claims.

Referring now to the accompanying drawings:

Figures 1 and 1a, when placed together, form a front elevational view partly in section, of the illustrative machine, certain parts being removed for the sake of avoiding undue complication;

Figure 2 is a plan view, partly broken away, of the machine with a cover plate at the top of the machine removed;

Figure 1:
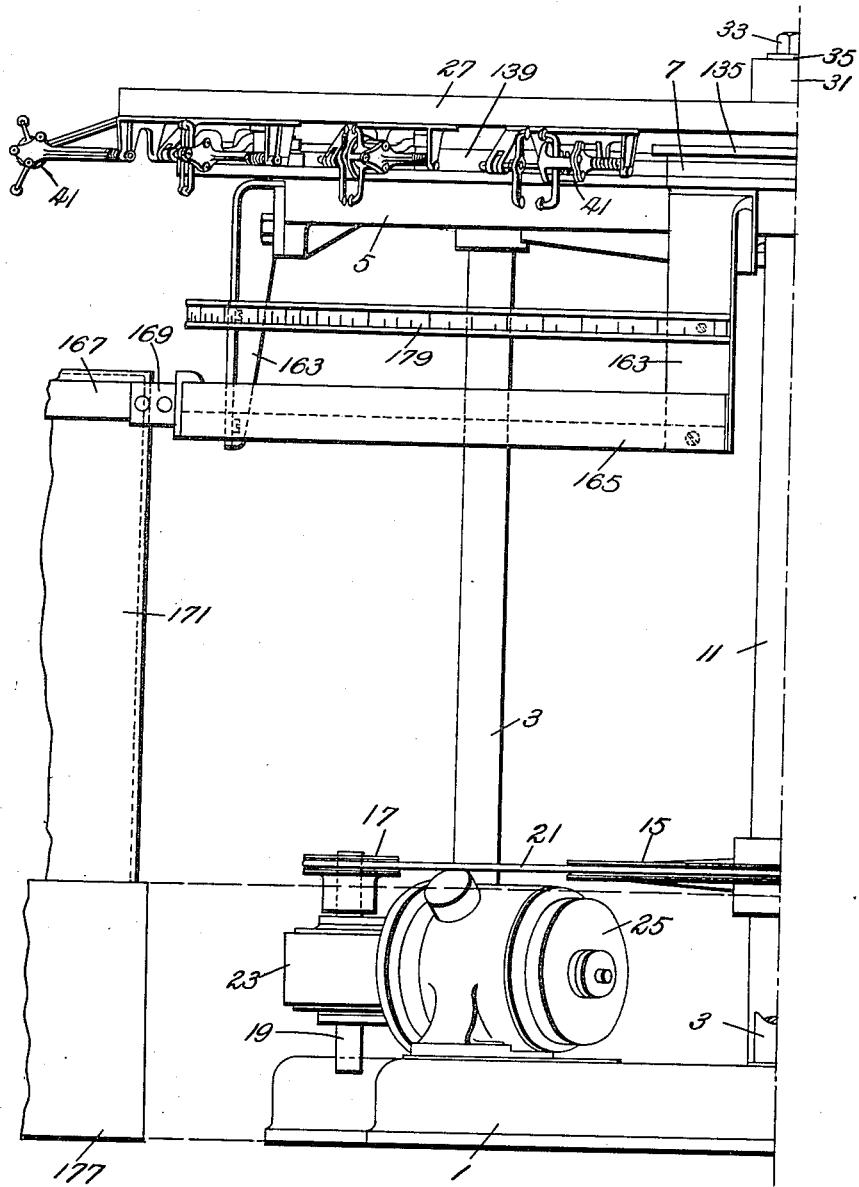

The illustrative machine comprises a base 1, conveniently about 3 ft. across, from which rise three columns 3 spaced symmetrically round the base. These columns serve to support a circular table 5 (Figures 1 and 2) which is held in place by nuts 6 on the columns and which has a large aperture in its central portion. Extending diametrically across the upper surface of the table 5 is a rib 7, the rib being secured to the table by two bolts 9. A vertical shaft 11 (Figure 1) is journaled at its lower end in a bearing formed at the centre of the base 1 and at its upper end portion in a bearing 12 mounted at the centre of the rib 7, a suitable aperture being formed in the rib to receive the bearing and shaft. Fixedly mounted on the shaft 11 is a large pulley 15 about which and about a smaller pulley 17 mounted on a short shaft 19 passes a belt 21. The shaft 19 is journaled in a casing 23 which encloses reduction gearing (not shown) through which the shaft 19 is driven from an electric motor 25. The motor 25 conveniently rotates at such a speed that the shaft 11 is driven through the reduction gearing and belt 21 at a speed of about four revolutions per minute.

A large turntable or carrier 27 is fixedly mounted on the upper end of the shaft 11. As shown in Figure 2 the turntable, for lightness, is conveniently in the form of a wheel with six spokes 29 radiating from a hub 31 into which the shaft 11 passes, the turntable being secured on the shaft by a nut 33 and washer 35. As shown in Figure 1 the rim of the turntable 27 has a small upstanding flange 37 formed on its upper surface around its peripheral portion and a circular cover 39 of fibre board or other light material is secured in position on the upper surface of the turntable between this flange 37 and the hub 31.

The turntable 27 has mounted around its peripheral marginal portion a series (actually twenty in the machine illustrated) of work clamping devices generally indicated by 41 (Figures 1, 2, 3, and 4). Before describing these devices in detail it will be convenient briefly to give some general idea of their mode of operation. Each device comprises a pair of work gripping jaws which are moved in open condition past two loading stations so that the operator can insert therebetween a piece of work to be graded. The device is carried past the loading stations on account of the rotation of the turntable; and, after the piece of work has been inserted between the jaws, the jaws are brought together to grip the work. The machine has cam means which act, as the turntable is rotated, to cause opening of the jaws of the clamping device when a release member in the form of a roll on the device comes into contact with the cam means, and the piece of work is thereby released. The angular position which the clamping device occupies about the axis of the turntable when the roll contacts with the cam means will depend upon the thickness of the work, since the position of the roll is controlled by the separation of the jaws of the clamping device which in turn depends directly upon the said thickness. Thus the work is released at an angular position about the axis of the turntable which depends upon its thickness; and, by arranging a number of work collecting receptacles under the path traversed by the clamping devices, pieces of work graded by the machine may be dropped into one or other of the receptacles in accordance with their thickness.

Figure 3:
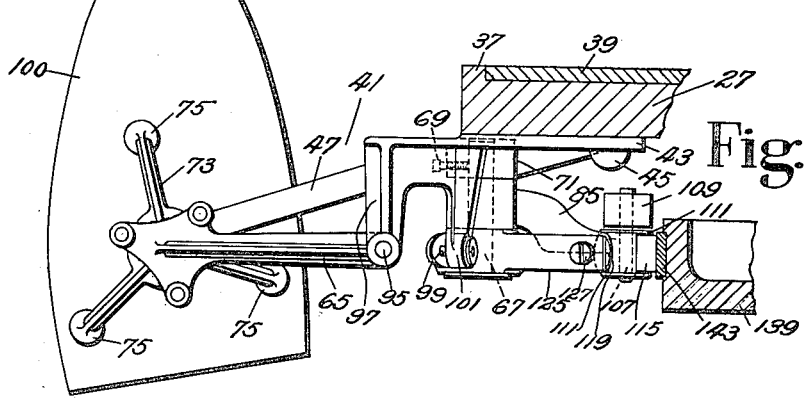
Figure 3 is a side elevational view, on an enlarged scale, of one of the work clamping devices with which the machine is provided.

Each clamping device (Figs. 3 and 4) comprises a casting 43. The casting 43 is secured by two bolts 45 (of which one is shown in Figure 3) to the underside of the marginal portion of the turntable 27. The casting 43 has a projecting arm 47 on which is mounted one of the work clamping jaws. The end of the arm 47 is forked and through a horizontal bore in the forked portion of the arm passes a threaded rod 49. In threaded relation with the rod 49 are two nuts 51, 53 of which the nut 51 is located between the forked portion of the arm 47. The threaded rod 49 has a keyway 55 (Figure 4) cut in it and in this keyway are received pins 57 projecting thereinto and set in the arm 47. The threaded rod 49 is thus prevented from rotating so that, on rotating the nut 51 (which is provided with holes 59 to receive a suitable implement to assist turning), the rod 49 may be adjusted in the direction of its axis with respect to the arm 47. The nut 53 serves to lock the rod 49 in adjusted position. At its inner end the rod 49 has fixedly mounted thereon a work engaging member 61. This member comprises three arms having formed at their ends three hemispherical elements 63. The arrangement is such that the hemispherical elements 63 lie at the apexes of an equilateral triangle the sides of which may conveniently be about 2½ inches.

The other work clamping jaw of each device 41 is mounted on an arm 65 which is pivoted on a stud 67, said stud being secured by a set screw 69 in a central aperture in a boss 71 formed on the casting 43. The arm 65 carries a work engaging member 73 generally similar to the member 61 and comprising three hemispherical elements 75 spaced similarly to the elements 63. The member 73 is however tiltably mounted with respect to the arm 65. The arm 65 has secured thereto by screws 77 a cage 79. The member 73 has a short conical pin 81 (Figure 4) projecting centrally therefrom which engages in a small recess formed in the head of the cage 79. A short compression spring 83 located within the cage 79 urges the pin 81 against the said recess and the arrangement is such that, though the member 73 is normally so located that its axis is parallel to that of the rod 49, it is capable of tilting movement in any direction about the point of the pin 81 to accommodate variations in the thickness of a piece of work being clamped at the different localities engaged by the elements 63, 75.

Pivotally mounted on the stud 67 above the arm 65 is a bell crank lever 85. A compression spring 87 extends between the head of a bolt 89 in threaded relation with the end of one arm of the bell crank lever or compressor 85 and a small boss formed on the arm 65. The degree of compression of this spring may be adjusted by turning the bolt 89 which is normally held securely in adjusted position by means of a locknut 91. A compression spring 93 which is somewhat weaker than the spring 87 extends between a small boss formed on the other side of the arm 65 and a bolt 95 in threaded relation with a downwardly extending lug 97 on the casting 43. Turning movement of the arm 65 about the stud 67 in the counterclockwise direction as seen from above (Fig. 4) is limited by an adjustable stop screw 99 in threaded relation with a second downwardly extending lug 101 on the casting 43, while turning movement of the bell crank lever 85 about the stud 67 in the clockwise direction, as seen from above, is limited by a stop-screw 103 in threaded relation with a third downwardly extending lug 105 on the casting 43.

Mounted at the end of the second arm of the bell crank lever 85 is a vertical pin 107 on which is rotatably mounted a roll 109, and pivoted on this pin there is also a small frame the sides of which are constituted by two similar levers 111. At one end the levers 111 are connected by a pin 113 on which is rotatably mounted a roll 115 while at the other end the levers are connected by a pin 117 on which is rotatably mounted a small roll 119. A tension spring 121 connected at one end to the lower lever 111 and at the other end to a hook 123 on the bell crank lever 85 normally tends to turn the levers 111 in a clockwise direction, as seen from above, about the pin 107.

Figure 4:
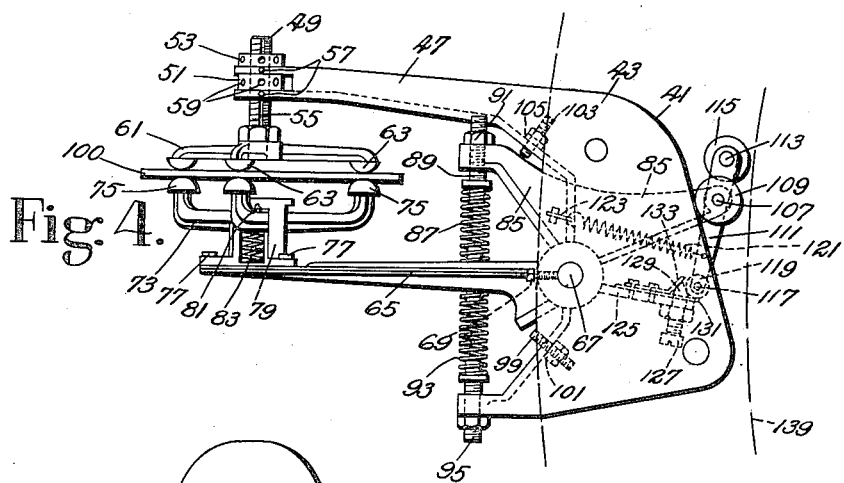
Figure 4 is a plan view of the device seen in Figure 3.

The arm 65 has a tail 125 thereof extending at the other side of the stud 67 from the major portion of the arm, and near the end of this tail 125 there is provided in threaded relation therewith a screw 127 having a conical end portion 129 projecting through the portion 125. When a piece of work is held by the clamping device as shown in Figures 3 and 4, the small roll 119 occupies a position in which it is held in contact with the conical surface 129 of the screw 127 and also with one face of the end portion of a hardened steel plate 131 fixed on the portion 125 of the arm 65. A second plate 133 with an inclined end portion prevents the roll 119 riding over the conical surface 129.

In Figure 4 the parts are shown with the jaws of the clamp engaging and holding the work 100, herein shown as a half sole. Before the work was clamped, the jaws were in separated relation by reason of the fact that the small frame, constituted by the small levers 111 and the pivot pins 113, 117, connecting their ends and the roll 119, had been swung counterclockwise by engagement of the cam means 139 (referred to above and later to be described) with the roll or release member 115. When this happened, the piece of work which was then being held by the clamping jaws 61, 73, was released. The small frame constituted by the small levers 111 and the pivot pins 113, 117, and the roll 119, it will be noted, forms a latch which, when in operative position as shown, is held in place by the spring 121 so that the bell crank lever and the arm 65 are locked together and the compression spring 87 is ineffective to swing the arm 65 and its clamping jaw 73 away from the jaw 61 into inoperative position. In consequence, therefore, of the operative position of the latch, the compression spring 93 is effective to hold the work clamped. The parts in Figures 3 and 4 are in the positions occupied after a piece of work has been clamped by the jaws and while it is moving along preparatory to being released and dropped into its proper receptacle. This release will take place as has been stated when the roll 115 is engaged by the cam means 139 and moved to the left as viewed in Figure 4. When this occurs, the small roll 119 of the latch will be swung to the right into inoperative position, and the compression spring 87 will swing the bell crank lever 85 into contact with the stop-screw 103 and the arm 65 into contact with the stop screw 101 thus instantly causing the jaws of the clamping device to fly apart and permitting the work to fall by gravity. The small roll 119 at this time will occupy a position in which it is in contact with the end edge surface of the plate 131. The clamp with its jaws open will then continue on its path until, as it approaches a loading station, the roll 109 is engaged by a special cam, later to be described, which moves the roll to the left as viewed in Figure 4. This swings the bell crank lever 85 counterclockwise to compress the spring 87 and to raise the latch to permit the tension spring 121 to swing the latch into the operative position shown with the small roll 119 in the angle between the adjacent face of the conical end of the screw 125 and the upper surface of the outer end of the plate 131. The jaws of the clamp are still open by reason of the pressure of the cam, referred to above, on the roll 109; and it is at this time that the operator presents a piece of work between the open jaws of the clamp. The moment the roll 109 runs off from the cam, the compression spring 93 swings the parts into the positions shown to clamp the work.

The means whereby the work clamping devices are actuated will now be described. The machine has two loading stations indicated by L¹ and L² in Figure 2. The arrangement is such that as the turntable 27 revolves the clamping elements 63, 75 of each device are in a separated position (the arm 65 being in contact with the stop screw 99) as the device passes the loading station. At each loading station there is provided a cam 135 (Figures 1, 2, and 5) fixedly mounted by bolts 137 to a flanged end portion of the rib 7. As each clamping device approaches one of the loading stations the small roll 119 will be in contact with the end edge surface of the plate 131. The cam 135 at each loading station is so shaped and positioned that by contact with the roll 109 it serves to turn the bell crank lever 85 counterclockwise (as seen from above) about the stud 67 against the action of the spring 87 and to such an extent that the roll 119 is moved beyond the end edge surface of the plate 131 and is therefore allowed to be drawn by the action of the spring 121 into the position in which it contacts with the conical surface 129 of the screw 127 and with the extreme end portion of the plate 131. So long as the cam 135 serves by contact with the roll 109 to maintain the bell crank lever 85 in its counterclockwise-turned position the elements 63, 75 will remain separated; and the operator, as the clamping device in question moves past the loading station, will insert between the said elements a piece of work 100 to be graded. The cam 135 with which the roll 109 contacts extends only a short distance beyond the loading station; and it is so shaped that, as the work clamping device travels past the loading station, the spring 93 is allowed to turn the bell crank lever 85 and the arm 65 as a unit in the clockwise direction (as seen from above) about the stud 67, thereby moving the elements 75 towards the elements 63 to grip the work held therebetween by the operator. On the work being so gripped the operator will release his hold on it and it will be carried on by the clamping device along as it moves around with the turntable 27.

The machine is provided with two large cam members 139 (Figures 1, 2, 3, 4, and 5) each of which is adapted to contact with the roll 115 on each clamping device to cause release of work therefrom. Each cam 139 is curved and is secured by bolts 141 to the table 5 the bolts passing through slots in the cam to allow the position of the cam to be adjusted if necessary by means hereinafter to be described. The operative surface of each cam 139 is reinforced by a steel band 143 (Fig. 3) let into a recess in the cam surface for the purpose of reducing wear. In the machine shown in the drawings the operative surface of each cam is in the form of a truly circular arc.

Figure 5:
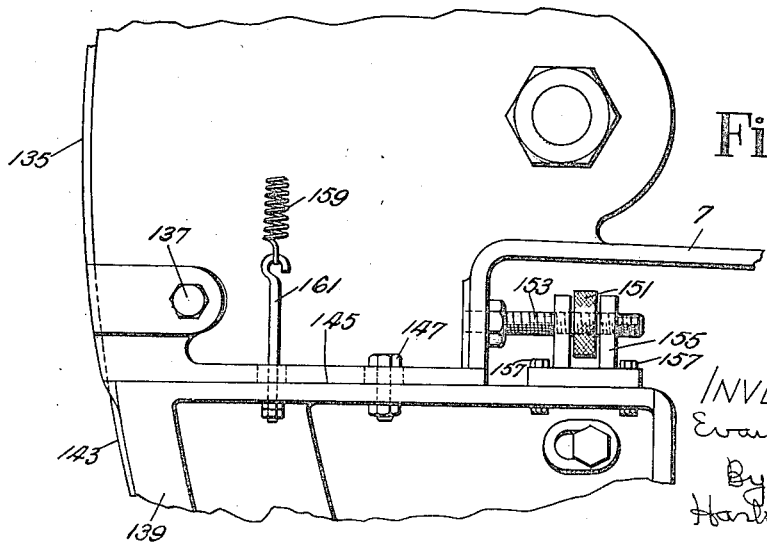
Figure 5 is a plan view, also on an enlarged scale, of certain adjusting means of the machine.

The means for adjusting the position of each cam 139 are illustrated best in Figure 5. Each cam at both its end portions bears against flat surfaces 145 formed at the sides of the rib 7, and adjusting means are provided at one of the end portions. Referring to Figure 5, which illustrates the adjusting means located at the left hand side of the cam 139 shown completely in Figure 2, this cam 139 is secured to the adjacent flat surface 145 of the rib 7 by means of a bolt 147 which passes through a slot in the rib 7. When this bolt, a corresponding bolt 149 (Figure 2) at the other end of the cam 139 and the bolts 141 are loosened, the cam 139 may be bodily adjusted in a direction parallel to the axis of the rib 7 by turning a nut 151 in threaded relation with a rod 153 fixed to the rib 7, the said nut 151 being retained in fixed position bodily with respect to the cam 139 by means of a forked bracket 155 which embraces the nut and is secured to the cam by bolts 157. Two springs 159 stretched between hooks 161 attached to the cams 139 and passing through slots in the rib 7 are provided to prevent the cams being undesirably displaced far out of position should by chance the bolts 141, 147, 149 be removed for any purpose.

The action of the cams 139 will be best understood from a brief consideration of what happens to a piece of work after it is placed by the operator in one of the work clamping devices and is gripped by the device and carried on thereby. Referring to Figure 2 let it be supposed that a piece of work 100 is inserted by the operator in a work clamping device at the loading station L². Looking at the machine from above the turntable 27 is slowly rotating in a clockwise direction. When the roll 109 of the device in question leaves the cam 135 at the station L² the elements 63, 75 of the device are urged together, as has been already described, by the spring 93, and the work is gripped there-between. When the work is so gripped, the angular position occupied by the arm 65 about the stud 67 will depend upon the thickness of the work, and consequently the radial distance between the roll 115 and the centre, marked $x$ in Figure 2 about which the turntable 27 rotates (i. e. the axis of the shaft 11) will also depend upon the thickness of the work. The cam, 139 shown completely in Figure 2, occupies a position such that though the centre, marked $y$ in Figure 2, of the circular arc of its operative surface is closely adjacent to the centre $x$ about which the turntable 27 rotates and both centres lie along the axis of the rib 7 yet, as seen in Figure 2, the centre $y$ is displaced through a short distance to the left of the centre $x$. It is this distance between the centres $x$ and $y$ which may be adjusted by turning the nut 151 in the manner already described. The arrangement is such that when a clamping device leaves the loading station L² gripping a piece of work the roll 115 (the position of which depends as already mentioned on the thickness of the piece of work) will lie some short distance away from the adjacent surface of the cam 139. As the clamping device is moved round by the turntable, on account of the eccentric mounting of the cam 139 the roll 115 (which moves in a circular path) gradually approaches the surface of the cam and finally, at a point somewhere between the loading station L² and the loading station L¹ and depending upon the thickness of the piece of work in the clamping device, the roll 115 contacts with the surface of the cam 139. Thereafter as the clamping device is carried around further the cam surface begins to cause turning of the frame or latch comprising the two levers 111 counterclockwise as seen from above about the pin 107. A very slight movement of the frame in this direction is sufficient to retract the small roll 119 from the position in which it contacts with the conical surface 129 of the screw 127 and with the extreme end portion of the plate 131 (Figure 4) whereupon the elements 63, 75 are immediately separated to the full extent by the spring 87. Upon this happening the piece of work will be immediately released and will fall by gravity from the clamping device; and the locality in the path of the clamping device between the loading station L² and the loading station L¹ at which the piece of work is released by, and falls from, the clamping device is dependent upon the thickness of the piece of work.

Means whereby the work is collected upon fall from the clamping devices will now be described. Two sets of such means are provided, one at each side of the machine, arranged respectively to collect work inserted at the loading stations L¹ and L². Since these two sets may be of entirely similar form only the set arranged to collect work inserted at the loading station L² will be described. Bolted to the table 5 are three downwardly extending brackets 163 (Figure 1) which serve to support a horizontal metal supporting strip 165 which is in the form of a circular arc almost but not quite the arc of a semicircle. On this strip are mounted a number of arms 167 extending radially horizontally outwardly therefrom. The arms 167 are actually secured to small supports 169 which embrace the strip 165 in such manner that though they normally occupy fixed positions with reference to the strip they can if desired be slid along the strip to alter the positions of the arms 167. These arms 167 support between them a number of tubes or chutes 171 of canvas or like material, within a hem in the top portion of each of which is located a flexible steel ring 173 (see the tube shown at the right hand portion of Figure 1). The arrangement of the tubes 171 is shown in Figure 2. In Figure 1 the majority of the tubes are not shown so as not unduly to complicate the figure. Each tube 171 is held at its top end between two adjacent arms 167 by means of clips 175, and the upper openings of the tubes are so disposed that they are adapted to receive pieces of work released by and falling from the clamping devices. It will be seen from Figure 2 that the junction between two adjacent tubes extends in the main substantially radially of the machine so that the chances are as large as possible that a falling piece of work will pass definitely into one tube or another without landing on the junction. Each tube 171 leads to one of a series of portable bins 177 which are conveniently positioned on the floor around the machine save at the loading stations. The bins are conveniently formed so that they taper somewhat to enable them to be packed neatly side by side. The arrangement of tubes just described is a very convenient one on account of the ease with which the size of the openings at the upper ends of the tubes may be adjusted if desired. As has already been described, in the operation of the machine pieces of work are dropped from the clamping devices at localities around the machine which are dependent upon the thicknesses of the pieces of work. Thus by arranging the tubes 171 so that dropped pieces of work fall into them the result is achieved that each tube will collect the pieces of work whose thicknesses lie in a certain small range. The extent of such range will depend upon the width of the opening at the upper end of the tube in question. Since it will be realized that the widths of the tube openings can readily be adjusted by sliding the supports 169 for the arms 167 in one direction or the other along the strip 165, the tubes can be adjusted to collect any desired range of work thickness within the limits determined by the degree of flexibility of the steel rings 173. Of course if it is desired to collect only a small range of work thicknesses in each tube the corresponding tube openings will be made narrow and a larger number of tubes (with corresponding bins 177) will be employed than in the case where the openings are wider.

Though the operation of the machine will have become generally clear from the foregoing it will be convenient now to describe this in further detail with particular reference to the adjustments of the machine.

As has already been mentioned the machine has two loading stations L¹ and L² at each of which an operator may stand and insert pieces of work into the open clamping devices as they travel past the stations on account of the rotation of the turntable 27. The speed of rotation of the turntable will be sufficiently slow (conveniently about four revolutions per minute) to insure that the operator will have no difficulty in inserting work into the moving clamping device and holding it between the elements 63, 75 thereof until, when the roll 109 leaves the cam 135 at the loading station in question, the elements 63, 75 approach each other to grip the work. It is of importance that all the clamping devices into which an operator at one of the loading stations inserts pieces of work should be similarly adjusted so that the grading of the work (that is the particular tube into which the work is allowed to fall) is independent of the particular clamping device into which the work has been inserted. This result may be insured by inserting the same piece of work into different clamping devices in succession and adjusting, where necessary, the position of the elements 63 of each device by turning the nut 51 until each device releases the piece of work at substantially the same locality.

The grading operation of the machine will depend both upon the setting of the fixed elements 63 of each clamping device and upon the degree of eccentricity of the cams 139. Suppose that the pieces of work to be graded all, or substantially all, lie within a minimum thickness T and a maximum thickness T+D and it is desired to set the machine so that it operates as efficiently as possible on this range of work thicknesses. This may be done as follows. The bolts 141, 147, 149 may be loosened and the cam 139 in question adjusted by means of the nut 151 until its position is such that if T' is the thickness of a piece of work of such thickness that the roll 115 will just contact with the operative surface of the cam when the turntable 27 has made almost a half revolution from the loading station, say L², in question, and if T'' is the thickness of the piece of work of such thickness that roll 115 will contact with the cam surface almost immediately after leaving the loading station, then T'—T'' should equal D. The cam 139 will then be in the desired position and the bolts 141, 147, and 149 will be tightened to lock it in such position. Next the position of the elements 63 of each clamping device will be adjusted by means of the nut 51 so that when a piece of work of the said minimum thickness T above referred to is inserted in any one of the clamping devices the roll 115 will contact with the operative surface of the cam 139 almost immediately after leaving the loading station in question. The machine will then be set so that if an operator standing at say L² inserts pieces of work into the clamping devices as they move past him pieces of thickness T will be dropped almost immediately after having been gripped while pieces of thickness T+D will be carried around through almost a half revolution before being dropped. Pieces of intermediate thicknesses will be dropped at intermediate points in accordance with their actual thickness (the action being a uniform one since the cam 139 has a continuous and not a stepped surface) and all the pieces will be collected through tubes 171 in bins 177. Each bin will of course receive a certain small range of thicknesses and the larger the number of tubes and bins employed the smaller such range will be. Once the machine has been set as just described a scale marked on say a paper strip or tape may be pinned or otherwise secured to an arcuate band 179 which is carried by the brackets 163. Such a scale may be calibrated directly to show the thicknesses of pieces of work that would be dropped at each locality thereunder.

The provision of two loading stations L¹ and L² enables two operators simultaneously to feed work to the machine. The work fed at the two loading stations will be graded at different sides of the machine and ordinarily the two cams 139 will have corresponding settings though it will be realized that the eccentric displacement of one cam will be in the opposite direction to that of the other. In some cases it might be desired to employ the same machine to grade work pieces of widely different sizes, for example, to grade both soles and heel lifts. In such event it would be convenient to provide alternate clamping devices with work gripping members 61, 73 of different sizes, the one adapted to grip one class of work and the other the other. An operator at one station would feed one class of work to the machine and an operator at the other station would feed the other class of work.

In Figure 3 the piece of work 100 is shown as a half-sole and it will be observed that the elements 75 engage this at three points spaced a substantial distance apart. It has already been described how the member 73 carrying the elements 75 is mounted so as to be capable of tipping movement about the point of the pin 81. Thus the member 73 may suitably accommodate itself, should there be any slight variations in thickness of the work at the different localities engaged by the elements 75; and the effect of this accommodation is such that the separation of the arms 47 and 65, when a piece of work is gripped between the elements 63, 75, is dependent upon the average thickness of the work at the localities engaged by the elements.

When a piece of work is gripped by one of the clamping devices its plane is substantially vertical and extends more or less radially of the turntable 27. This arrangement is very advantageous in that it permits of accurate sorting into the tubes 171 as the work is dropped. As seen in Figure 2 the divisions between the tubes 171 are quite narrow and when a piece of work is dropped from one of the clamping devices it falls with its plane substantially parallel to that of the closest adjacent division, and thus the chances of its falling on a division and so perhaps being deflected into one tube, whereas but for falling on the division it should have fallen into the next, are reduced to a minimum.

The hereinbefore described arrangement whereby a very slight displacement of the roll 115 by the operative surface of cam 139 causes a sharp springing apart of the clamping jaws of each device under the action of the spring 87, is also an important factor in the securing of accurate sorting. While with certain classes of work satisfactory results might be obtained by employing a machine in which release of the clamping jaws is obtained merely by a slow separation of the jaws resulting directly from displacement by a cam 139 of a roll or the like, the hereinbefore described arrangement is more satisfactory in that the quick release of the clamping jaws under spring action insures that the work falls sharply from each device and does not slowly slip downwardly therefrom before falling freely. The quickness of separation of the jaws after contact of the roll 115 with cam 139 may be adjusted somewhat by altering the setting of the screw 127.

Although the invention has been described as embodied in a particular machine particularly adapted to sort heel lifts and soles it should be understood that the invention is not limited in the scope of its application to the particular machine or to the work which has been shown and described.

Having described my invention, what I claim as new and desire to secure by Letters Patent of the United States is:

1. A sorting machine having in combination a rotary carrier, a plurality of work-holding clamps mounted on the carrier each clamp comprising a jaw movable into operative position to clamp the work, a release member connected with the jaw the distance of which from the axis of rotation of the carrier depends upon a dimension of the particular piece of work held by the clamp, cam means for engaging each of said release members to move them first in one direction and then in another, and opposed springs acting to open and to close the jaws upon movements of the released members.

2. A sorting machine having in combination a rotary carrier, a plurality of work-holding clamps mounted on the carrier each clamp comprising a jaw movable into operative position to clamp the work, a release member connected with the jaw the distance of which from the axis of rotation of the carrier depends upon a dimension of the particular piece of work held by the clamp, cam means for engaging each of said release members to move them, springs held compressed while the work is clamped and acting upon movement of said release members to cause the jaws of the clamps to fly apart to free the work, and means for compressing each spring after the release of the work held by its clamp and for holding the springs compressed and the jaws open while another piece of work is presented between the jaws.

3. A sorting machine having in combination a rotary carrier a plurality of work-holding clamps mounted on the carrier each clamp comprising a jaw movable into operative position to clamp the work, a release member connected with the jaw the distance of which from the axis of rotation of the carrier depends upon a dimension of thhe particular piece of work held by the clamp, cam means for engaging each of said release members to move them, springs held compressed while the work is clamped and acting upon movement of said release members to cause the jaws of the clamps to fly apart to free the work, and means for compressing each spring after the release of the work held by its clamp, for holding the springs compressed and the jaws open while another piece of work is presented between the jaws and for closing the jaws and maintaining the compression of the springs preparatory to the release of said second piece of work.

4. A sorting machine having in combination a rotary carrier, a plurality of work-holding clamps mounted thereon, each clamp comprising a jaw movable into operative position to clamp the work, a release member connected with the jaw the distance of which from the axis of rotation of the carrier depends upon a dimension of the particular piece of work held by the clamp, cam means for engaging said members to move them first in one direction and then in another, and springs responsive to said movements for opening and closing the jaws.

5. Work clamping and releasing means for a sorting machine, said means comprising a base, a jaw rigid with said base, a jaw movable with respect to said base, a spring tending at all times to urge the movable jaw toward the other jaw to clamp a piece of work, a second spring acting, when permitted to do so, in opposition to the first spring, and a latch for holding the second spring compressed but inoperative, said latch being capable of being tripped to permit the second spring to move the movable jaw away from the other jaw.

6. Work clamping and releasing means for a sorting machine, said means comprising a base, a jaw rigid with the base, a jaw pivoted to the base for movement toward and away from the rigid jaw, a spring tending at all times to urge the movable jaw toward the rigid jaw to clamp a piece of work, a second spring adapted to act on the movable jaw in opposition to the first spring, a compressor pivoted to the base between which and the movable jaw said second spring is located, and a latch between a portion of the movable jaw and a portion of the compressor for holding the second spring compressed and inoperative, said latch being capable of being tripped to permit the second spring to move the movable jaw away from the rigid jaw.

7. Work clamping and releasing means for a sorting machine adapted to clamp the work, to be moved in a predetermined path and to release the work at localities along said path, said work-clamping means comprising two jaws each provided with a set of separated work-engaging members arranged at the apices of a triangle, the members of one set being located respectively opposite to those of the other set and yielding means for supporting one set for rocking movement about a point located within the triangle to permit said last-named set to yield to inequalities in the thickness of the work.

EVAN GEORGE WILSON.